Oct. 4, 1966 M. M. A. GOUILLOUD ETAL 3,277,440

METHODS AND APPARATUS FOR RECORDING WELL LOGGING DATA ON MAGNETIC TAPE UTILIZING RECORDED REFERENCE SIGNALS FOR CONTROL PURPOSES

Filed Sept. 30, 1963 2 Sheets-Sheet 1

Michel Marie Albert Gouilloud
Gilbert Jean Marchand
INVENTORS

BY Richard E. Bee

ATTORNEY

Oct. 4, 1966 M. M. A. GOUILLOUD ETAL 3,277,440

METHODS AND APPARATUS FOR RECORDING WELL LOGGING DATA ON MAGNETIC TAPE UTILIZING RECORDED REFERENCE SIGNALS FOR CONTROL PURPOSES

Filed Sept. 30, 1963 2 Sheets-Sheet 2

Michel Marie Albert Gouilloud
Gilbert Jean Marchand
INVENTORS

BY Richard E. Bee

ATTORNEY

United States Patent Office 3,277,440
Patented Oct. 4, 1966

3,277,440

METHODS AND APPARATUS FOR RECORDING WELL LOGGING DATA ON MAGNETIC TAPE UTILIZING RECORDED REFERENCE SIGNALS FOR CONTROL PURPOSES

Michel Marie Albert Gouilloud and Gilbert Jean Marchand, Paris, France, assignors to Societe de Prospection Electrique Schlumberger S.A., Paris, France, a corporation of France Filed Sept. 30, 1963, Ser. No. 312,571
Claims priority, application France, Oct. 6, 1962, 911,515
9 Claims. (Cl. 340—18)

Figure 1:
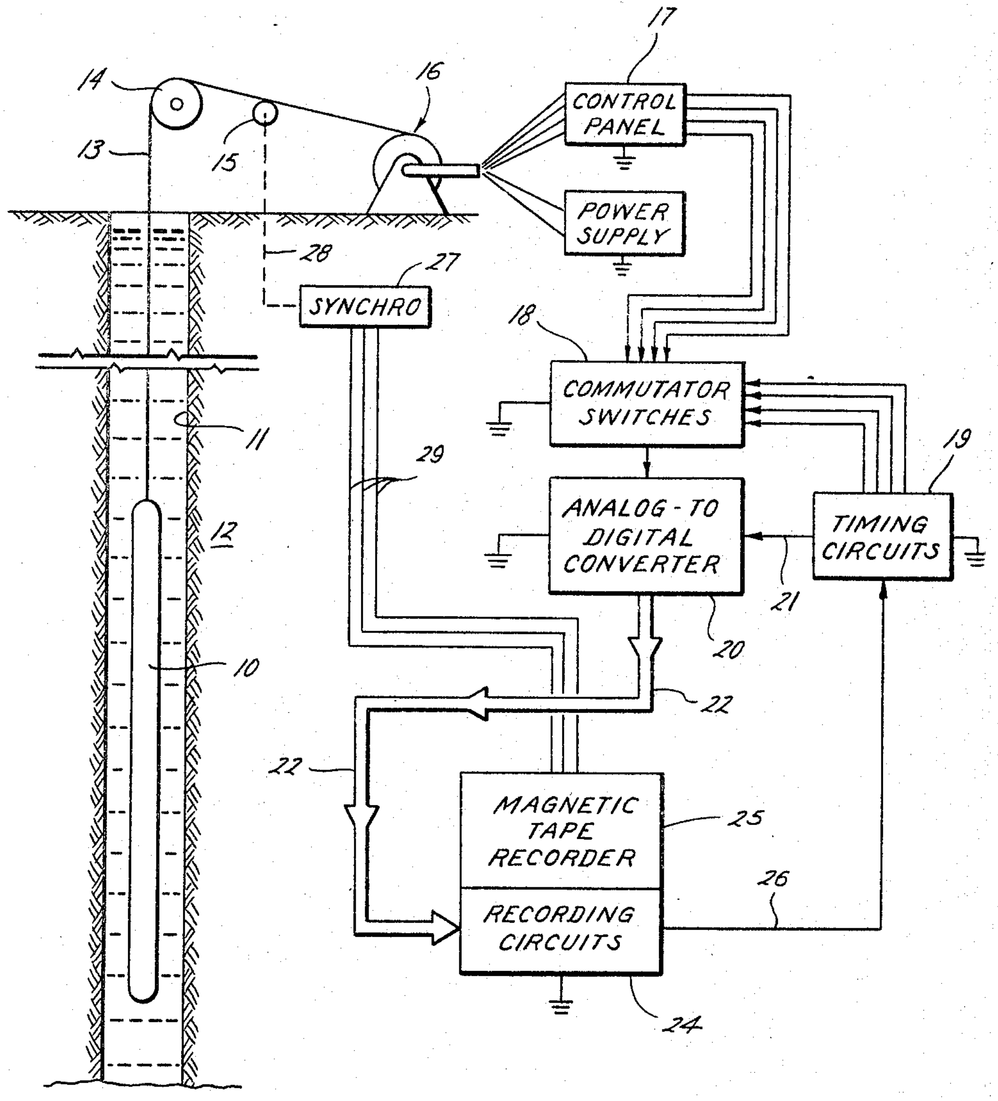

This invention relates to methods and apparatus for recording well logging data on magnetic tape.

Well logging data is obtained by moving one or more exploring devices through a borehole drilled into the earth. Measurements made with such exploring devices are useful in determining the character and extent of the various subsurface earth formations. This information is of much value in locating various subsurface hydrocarbon deposits, such as oil and gas.

It is becoming increasingly common for the exploring instrument which is lowered into the borehole to include several different exploring devices for making several different measurements. Since oil well boreholes frequently extend several thousand feet into the earth, this presents a large volume of data which needs to be processed and interpreted. It would be desirable, therefore, to provide some means for recording this data so that it might be fed directly into an electronic data processing machine or computer. Magnetic tape provides just such a medium since most modern data processing machines are adapted to accept data rceorded on such tape. It is known, however, that these data processing machines and computers have very strict requirements with respect to the manner in which the data is recorded on the magnetic tape. In particular, these machines require that the data be recorded at a constant density on the tape and that the different elements of the data be arranged in certain well-defined groupings or patterns.

These requirements present various problems for the case of well logging data. In the first place, it would be advantageous if the well logging data could be recorded as a function of the depth of the exploring instrument in the borehole. The exploring instrument, however, does not always move through the borehole at a constant speed. As a consequence, the well logging data does not occur at a constant rate. Because of this, the data cannot very easily be recorded directly on the magnetic tape as a function of the borehole depth and still have the necessary uniform data density in terms of the desired input parameter, which in this case is borehole depth. In other words, it would be desirable if the data could be recorded in uniformly spaced increments along the length of the magnetic tape with the spacing being proportional to the borehole depth. This is difficult to do where the rate of movement of the exploring instrument is subject to considerable variation.

Another problem is that in order to meet the strict requirements of the subsequent data processing machine generally requires tape recording apparatus of a highly accurate and stable type, which is usually fairly delicate in nature. Well logging data, on the other hand, is obtained at the well site, which is usually a relatively rough or harsh environment. Consequently, it would be desirable to have a tape recording system of a more rugged, less complex nature, which is capable of withstanding a rugged environment and still provide the required degree of accuracy. In general, such a system would also be less expensive.

It is an object of the invention, therefore, to provide a new and improved method of recording well logging data on magnetic tape which overcomes one or more of the foregoing difficulties.

It is another object of the invention to provide new and improved apparatus for recording well logging data on magnetic tape which enables the data to be uniformly spaced along the length of the tape as a function of the depth of the exploring instrument in the well.

In accordance with one feature of the invention, a method of recording well logging data on magnetic tape comprises recording reference signals along the length of the tape. The method also includes moving exploring means through the well for developing data signals representative of subsurface conditions. The method further includes moving the magnetic recording tape in synchronism with the movement of the exploring means through the well. The method also includes recording signals representative of the data signals along the tape at locations determined by the reference signals.

For a better understanding of the present invention, together with other and further objects and features thereof, reference is had to the following description taken in connection with the accompanying drawings, the scope of the invention being pointed out in the appended claims.

Figure 2:
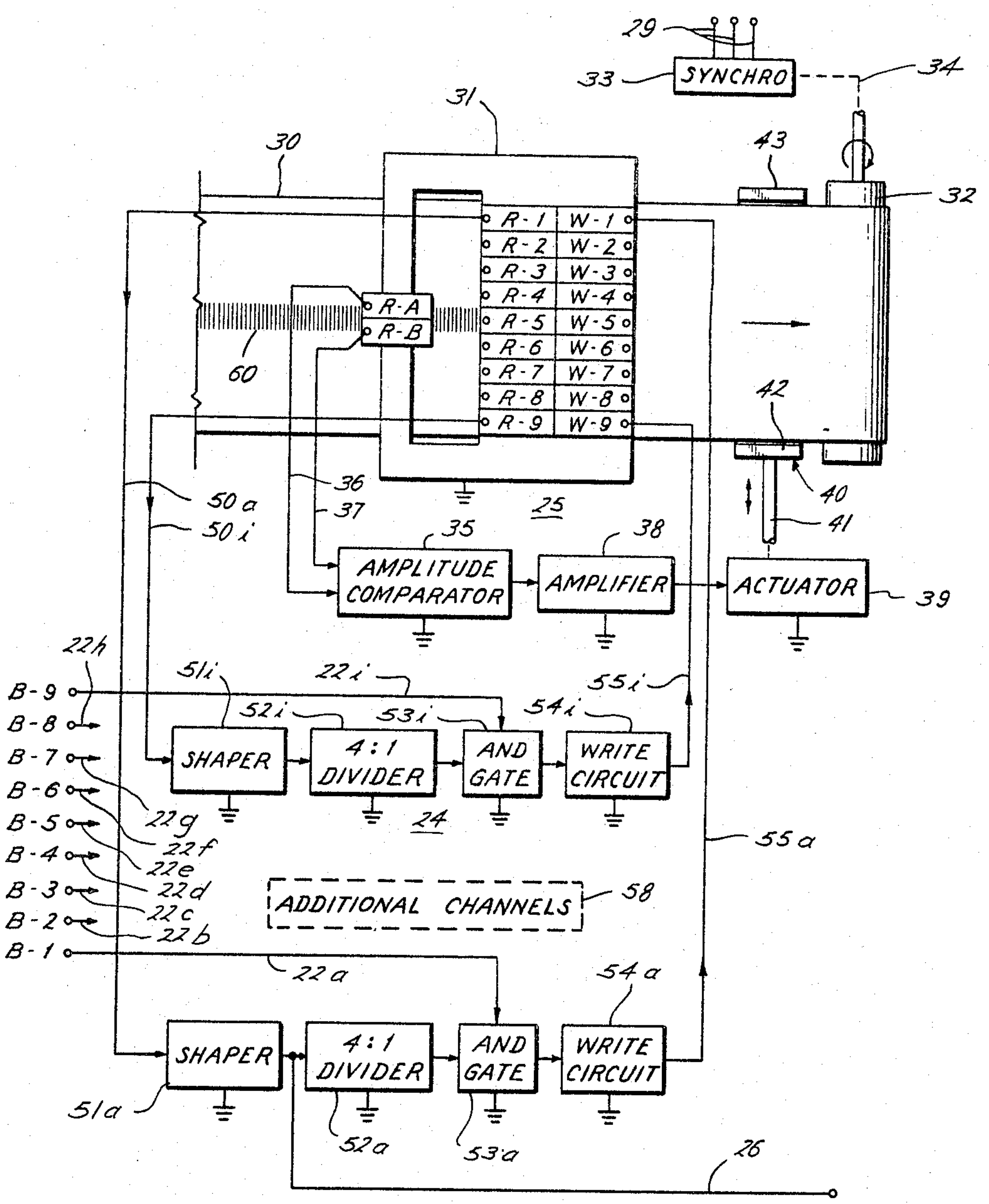

Referring to the drawings:

FIG. 1 shows, in a schematic manner, a representative embodiment of apparatus for practicing the present invention; and FIG. 2 shows a portion of the FIG. 1 apparatus in a more detailed manner.

Referring to FIG. 1 of the drawings, there is shown an exploring instrument 10 adapted for movement through a borehole 11 drilled into the earth 12. The exploring instrument 10 is suspended in the borehole 11 by means of an armored multiconductor cable 13, which passes over a sheave wheel 14, a measuring wheel 15 and to a suitable drum and winch mechanism 16 located at the surface of the earth. The remainder of the apparatus shown in FIG. 1 is also located at the surface of the earth. For purposes of explanation, it is assumed that the exploring instrument 10 includes four different exploring devices or mechanisms, each providing its own separate electrical output signal representative of a particular subsurface condition or characteristic. These data signals are supplied by way of conductors in the cable 13 to a control panel 17 located at the surface. Control panel 17 provides any scale adjustment or other preliminary signal conditioning that may be required.

The four data signals from the control panel 17 are supplied to commutator switches 18. Commutator switches 18, under the control of gating puses from timing circuits 19, operate to supply the data signals one at a time, in a repetitive sequence, to an analog-to-digital converter 20. A reset pulse via conductor 21 serves to reset the converter 20 just prior to each conversion interval. The converter 20 operates to convert the data signal supplied to the input thereof into a multi-bit parallel-type digital signal with the individual bits appearing on different ones of a plurality of parallel output lines. These output lines are contained within a conductor bundle 22. For sake of an example, it is assumed that the well logging data signal is converted into a nine-bit digital signal. This digital signal is then supplied to recording circuits 24 which, in turn, control magnetic tape recorder 25. Recording circuits 24 also supply synchronizing signals by way of a conductor 26 to the timing circuits 19.

A synchro generator 27 is mechanically connected to the measuring wheel 15 by way of linkage 28 and is electrically connected to a synchro receiver located within the tape recorder unit 25 by way of conductors 29.

Referring now to FIG. 2 of the drawings, there is shown in a more detailed manner the various elements included within the recording circuits 24 and the magnetic tape recorder 25. As seen in FIG. 2, the tape recorder 25 includes a strip of magnetic recording tape 30 which is adapted to pass beneath a rigid frame member 31 in the direction indicated by the arrow. Tape 30 is driven by a tape driving means represented in this embodiment by a take-up roller or reel 32. Take-up roller 32 is mechanically coupled to a synchro receiver 33 by means of linkage 34. The synchro receiver 33 is, in turn, electrically coupled to the synchro generator 27 (FIG. 1) by means of conductors 29.

The magnetic tape 30 includes nine longitudinal recording tracks of equal width which are spaced apart from one another across the width of the tape 30 in a uniform manner. Mounted on the rigid frame member 31 and positioned in a side-by-side manner across the width of the tape 30 are nonmagnetic pick-up heads or reading heads R–1, R–2, R–3, etc. Each head is positioned above one of the tracks on the tape 30. Also mounted on the frame member 31 in a side-by-side manner across the width of the tape 30 are nine individual magnetic recording heads or writing heads W–1, W–2, W–3, etc. Each of these writing heads is located above a corresponding track on the tape 30 and is in longitudinal alignment with the corresponding reading head. The writing heads are located on the downstream side of the reading heads relative to the direction of movement of the tape 30.

The frame member 31 also has mounted thereon an additional pair of magnetic pick-up heads or reading heads R–A and R–B. These additional reading heads R–A and R–B are located on the upstream side of the nine reading heads R–1, R–2, R–3, etc. and are positioned so that each is located above one half of the middle track, in this case, the fifth track on the magnetic tape 30. The width of the reading slots in the additional heads R–A and R–B is such that these heads will normally detect only the magnetic characters in the middle track and not the magnetic characters in either of the neighboring tracks.

The different transverse rows of heads are secured to the frame member 31 in a manner such that the reading or recording slots are arranged respectively along three transverse lines or axes which are, as accurately as possible, parallel to each other and perpendicular to the desired direction of tape movement.

The output windings of the reading heads R–A and R–B are connected to the two inputs of an amplitude comparator 35 by means of conductors or lead wires 36 and 37. Amplitude comparator 35, which may take the form of a differential amplifier, serves to develop an output control signal which is representative of the difference in the signals detected by the reading heads R–A and R–B. This control signal is supplied by way of an amplifier 38 to an electro-mechanical actuator 39. Actuator 39 may take the form of a servo motor plus a device, such as a lead screw, for converting its rotary motion to linear motion. The mechanical output member of actuator 39 is mechanically coupled to a slidable guide plate 40 by means of a linkage 41. The guide plate 40 is positioned immediately below the magnetic tape 30 and is provided with a pair of raised edges or guide members 42 and 43 for engaging the edges of the tape 30. The guide plate 40 is mounted so that, under the control of the actuator 39, it can move transversely or cross-wise to the direction of movement of the tape 30.

The output coil of the reading head R–1 is connected by way of a conductor **50*a* to a signal shaper circuit 51*a*. Shaper circuit 51*a* serves to reshape or regenerate the voltage pulses corresponding to the flux transitions on the tape 30. These regenerated pulses are then supplied to a 4:1 divider circuit 52*a* which, in response thereto, produces an output pulse for every fourth input pulse. Divider 52*a* may take the form of a 4:1 counter circuit. The pulses at the output of divider 52*a* are supplied to a first input of a coincidence circuit or AND gate 53*a*. A conductor 22*a*, included in the parallel conductor bundle 22 of FIG. 1, is connected to the second input of the coincidence circuit or AND gate 53*a*. Conductor 22*a* carries signal indications representative of the first bit (B–1 bit) of the parallel digital signal. If the B–1 bit has a binary value of "one," the AND gate 53*a* will pass the pulse from the divider 52*a* to the input of a write circuit 54*a*. Write circuit 54*a* includes a bistable flip-flop circuit and a balanced amplifier circuit which is controlled by such flip-flop circuit and which is adapted to provide output currents of either positive or negative polarity. These output currents are supplied by way of an output conductor 55*a* to the coil of the W–1 writing head. The amplitude of this current is, in either case, always sufficient for magnetically saturating the magnetic material on the tape 30**.

There is connected between each of the other reading heads R–2, R–3, etc., and its corresponding writing head W–2, W–3, etc., a set of circuits corresponding to those just described for the R–1 and W–1 pair. For sake of simplicity, only the circuits for the last or R–9, W–9 pair are also shown in detail, these circuits for the R–9, W–9 pair including a shaper **51*i*, a 4:1 divider 52*i*, a coincident circuit or AND gate 53*i* and a write circuit 54*i*. The remainder of the circuits for the intermediate pairs of heads are indicated by a dash-line box 58 labeled "additional channels." Each of the additional parallel digital input lines 22*b*, 22*c*, etc., is connected to the second input of the AND gate associated with the read-write head pair which is assigned to the corresponding binary bit. Thus, as shown for the last pair, the digital signal line 22*i* for the B–9 bit is connected to the second input of the AND gate 53*i* associated with the R–9, W–9** head pair.

Circuit means (not shown) may also be provided for periodically resetting the 4:1 divider circuits **52*a*–52*i* to an initial or zero condition for insuring that they are always operating or counting in step with one another. This can be done by supplying a suitable timing pulse from the timing circuits 19 (FIG. 1) to a reset terminal of each of the dividers 52*a*–52*i***.

The output of one of the shaper circuits, in this embodiment the shaper circuit **51*a*, is also supplied by way of the conductor 26 to the timing circuits 19 of FIG. 1. These shaper circuit pulses serve to synchronize or control the operation of the timing circuits 19. This, in turn, controls the timing of the commutator switches 18 and the timing of the conversion process in the analog-to-digital converter 20 in a manner which is properly in step with the operation of the recording circuits 24. To this end, the timing circuits 19 may take the form of a counting circuit chain having the appropriate selection circuits coupled thereto for providing the various timing pulses at the appropriate moments, the synchronizing pulses on conductor 26** being used to drive the counting chain.

Considering now the method whereby the well logging data is recorded on the magnetic tape, the magnetic tape 30 is initially run through a standard tape recorder apparatus which accurately records evenly-spaced reference signals along the length of the tape in each of the nine tracks thereof. The reference signals on the different tracks are also accurately in step with or in phase with one another such that corresponding elements thereof lie along transverse lines which are accurately perpendicular to the edges of the tape 30. In the present embodiment, these reference signals are recorded at a rate or density which is four times larger than the rate or density which is desired for the recording of the well logging data signals. The flux transitions in the reference signals for the middle track are represented symbolically in FIG. 2 by reference marks 60. For sake of simplicity, the marks for the other tracks are omitted. The standard tape recorder apparatus which is used to record these reference signals is a high quality, high accuracy, laboratory-type machine capable of recording these reference marks in a manner which completely satisfies the most stringent operating requirements of any of the data processing or computer apparatus with which the tape will subsequetnly be used. Since this preliminary recording of reference signals may be done at an ideal central location and not at the well site, no problem of a rough operating environment is involved. Also, only one standard recorder is required to provide the precalibrated or pre-marked tapes for many different field units.

The pre-calibrated or pre-marked tape is taken to the well site at which the well logging data is to be obtained and is placed on the tape transport of the tape recorder 25 of the present invention. The well logging operation is then performed. In particular, as the exploring instrument 10 of FIG. 1 is moved through the borehole 11, the magnetic tape 30 is moved longitudinally past the various reading and writing heads of frame member 31 at a rate which is proportional to the rate of movement of the exploring instrument 10 through the borehole 11. This synchronized movement is obtained by means of the measuring wheel 15 which is rotated by the cable 13, the synchro generator 27 and the synchro receiver 33, the latter of which drives the take-up roller 32 of the tape recorder 25. Thus, the rate of movement of the tape 30 varies in the same manner as does the rate of movement of the exploring instrument 10.

At the same time, the data signals developed by the various devices mounted on the exploring instrument 10 are supplied by way of the conductors of cable 13 and the control panel 17 to the commutator switches 18. Commutator switches 18 operate to supply these data signals one at a time, in a predetermined sequence, to the input of the analog-to-digital converter 20. Each time a different data signal is supplied to the input of the analog-to-digital converter 20, such converter 20 operates to convert this data signal to a nine-bit parallel digital signal, the individual bits of which appear on nine separate digital signal lines 22*a*–22*i* which are connected to the recording circuits 24. These nine lines are contained within the conductor bundle 22 of FIG. 1. Thus, a time-multiplexed series of parallel digital signals which are representative of the various data signals coming from the exploring instrument 10 are supplied to the recording circuits 24.

Referring now particularly to FIG. 2, as the magnetic tape 30 progresses beneath the frame member 31, the two reading heads R–A and R–B operate to detect the reference signals recorded in the middle track on the tape. Since these reading heads R–A and R–B are symmetrically located with respect to the desired longitudinal axis for the middle track on the tape 30, equal signals will be detected by these heads R–A and R–B if the tape 30 is passing beneath the frame member 31 in exactly the proper manner. If, however, the tape should be somewhat off center or shifted to one side, then unequal signals will be detected by these heads. The signals developed by the reading heads R–A and R–B are compared by the amplitude comparator 35. Comparator 35 develops an output error signal if these two signals are unequal. This error signal is supplied by way of the amplifier 38 to the actuator 39. In response to this error signal, actuator 39 operates to adjust the transverse or cross-wise positioning of the slidable guide plate 40 so as to shift the tape 30 sideways until the middle track becomes properly aligned with the reading heads R–A and R–B. The error signal then becomes zero and further adjustment ceases. As a consequence of this transverse adjustment control, the different tracks on the tape 30 will accurately pass beneath their respective pairs of reading and writing heads.

The digital representations of the various data signals are recorded on the magnetic tape 30 by supplying the individual signal bits B–1 through B–9 to the corresponding ones of the AND gates 53*a*–53*i*.

Considering for the moment, the operation of the circuits for the B–1 bit, such bit is supplied by the conductor 22*a* to the AND gate 53*a*. At the same time, the set of reference marks or signals recorded in the first track on the tape 30 are being detected by the R–1 reading head. Pulses corresponding to these marks are, consequently, supplied by the shaper 51*a* to the 4:1 divider 52*a*. Upon the occurrence of every fourth one of these reference marks, the divider 52*a* develops an output pulse which is supplied to the AND gate 53*a*.

If the signal on the conductor 22*a* is at the binary "one" level, then the pulse from the divider 52*a* passes through the AND gate 53*a* to the write circuit 54*a*. Such pulse switches the flip-flop circuit included in the write circuit 54*a* and causes it to change the polarity of the recording current being supplied to the W–1 writing head. If, on the other hand, the signal on conductor 22*a* is at the binary "zero" level, then no pulse is supplied to the write circuit 54*a* and no reversal occurs in the current being supplied to the W–1 writing head. Thus, a reversal of magnetic flux polarity or direction on the tape 30 represents a binary "one" value while the absence of any such reversal represents a binary "zero" value. As mentioned, the amplitude of the current supplied to writing head W–1 is always sufficient to saturate the magnetic tape 30. As a consequence, the reference marks previously recorded in track one are wiped out or erased as they pass beneath the W–1 writing head.

The recording circuits for the other bits B–2, B–3, etc., of the digital signal operate in a similar manner. The recording currents supplied to the other writing heads W–2, W–3, etc., similarly serve to erase the reference marks previously recorded in their tracks on the tape 30.

The fact that the write circuits 54*a*–54*i* are controlled by pulses which are derived from the reference marks previously recorded on the magnetic tape 30 results in two important advantages. In the first place, it means that the increments or elements of the digital data signals recorded by writing heads W–1, W–2, W–3, etc., will be evenly and uniformly spaced along the length of the tape 30 even though the rate of movement of the tape 30 may vary. Thus, the well logging data is accurately recorded with a constant density. In the second place, since the reference marks are accurately aligned with one another along transverse lines which are accurately perpendicular to the longitudinal axis of the tape 30, the resulting elements of the digital signals will be recorded in a similar manner with the same accuracy even though the tape 30 may be somewhat skewed as it passes beneath the frame member 31. These advantages enable a less expensive and less delicate tape recording apparatus to be provided at the well site, while still obtaining tape recordings which have the required accuracy for use with commercial digital computers and data processing machines.

The fact that the reference signals are recorded on the magnetic tape 30 at a multiple of the rate at which the data signals are subsequently recorded on the tape leads to a simplification of the timing circuits used to control the various operations which are performed on the data signals before they are supplied to the recording circuits. In particular, because of the higher frequency or higher rate of the pulses supplied by way of the conductor 26 to the timing circuits 19, various initial or intermediate operations in each recording cycle, such as the switching of switches 18 and the resetting of the converter 20, may be readily timed by utilizing the pulses occurring on conductor 26 intermediate every fourth pulse. This avoids the need for any frequency multiplication circuits for providing intermediate timing. Also, the use of pulses derived from the recorded reference signals enables the preliminary operations to be accurately synchronized with the movement of the magnetic tape, even though the rate of such movement may vary to a substantial extent.

In cases where tape skew or obliquity is either nonexistent or within tolerable limits, then certain simplifications may be made in the tape recorder apparatus and recording circuits. In such case, all but one of the reading heads R–1, R–2, R–3, etc., may be omitted, together with their corresponding shaper and diver circuits. In ths case, the output of the remaining divider circuit would be connected to the first input of each of the nine AND gates 53*a*–53*i*. This would still provide the desired constant density recording of the digital data, even though the tape speed be subject to variation.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of recording well logging data on magnetic tape comprising:
   - recording reference signals along the length of a magnetic recording tape;
   - moving exploring means through the well for developing data signals representative of subsurface conditions;
   - moving the magnetic recording tape in synchronism with the movement of the exploring means through the well; and
   - recording signals representative of the data signals along the tape at locations determined by the reference signals.

2. A method of recording well logging data on magnetic tape comprising:
   - recording evenly-spaced magnetic reference marks along the length of a magnetic recording tape;
   - moving exploring means through the well for developing data signals representative of subsurface conditions;
   - moving the magnetic recording tape in synchronism with the movement of the exploring means through the well;
   - detecting the recorded reference marks during such movement;
   - and recording a signal representative of the data signal on the magnetic tape each time every Nth reference mark is detected, where N is an integer other than zero.

3. A method of recording well logging data on magnetic tape comprising:
   - recording reference signals along the length of a magnetic recording tape;
   - moving exploring means through the well for developing analog data signals representative of subsurface conditions;
   - moving the magnetic recording tape in synchronism with the movement of the exploring means through the well;
   - converting the analog data signals into digital data signals;
   - and recording the digital data signal elements along the tape at locations determined by the reference signals.

4. A method of recording well logging data on magnetic tape comprising:
   - recording reference signals along the length of a magnetic recording tape;
   - moving exploring means through the well for developing analog data signals representative of subsurface conditions;
   - moving the magnetic recording tape in synchronism with the movement of the exploring means through the well;
   - repetitively converting the analog data signals into digital data signals;

- recording the digital data signal elements along the tape at locations determined by the reference signals;
   - and utilizing the reference signals to control the timing of the converting action.

5. A method of recording well logging data on magnetic tape comprising:
   - recording reference signals along the length of a magnetic recording tape;
   - moving exploring means through the well for developing a plurality of data signals representative of a plurality of subsurface conditions;
   - moving the magnetic recording tape in synchronism with the movement of the exploring means through the well;
   - recording signals representative of the different data signals one at a time in a repetitive sequence along the tape at locations determined by the reference signals:
   - and utilizing the reference signals to control the sequencing of the different data signals.

6. A method of recording well logging data on magnetic tape comprising:
   - recording reference signals in a plurality of parallel tracks along the length of a magnetic recording tape;
   - moving exploring means through the well for developing analog data signals representative of subsurface conditions;
   - moving the magnetic tape in synchronism with the movement of the exploring means through the well;
   - converting the analog data signals into parallel digital data signals;
   - separately detecting the reference signals recorded in the different tracks on the magnetic tape;
   - recording the digital data signal elements across the magnetic tape in the various tracks thereof;
   - and using each of the sets of detected reference signals to control the recording of the digital signal elements in the corresponding track on the magnetic tape.

7. A method of recording well logging data on magnetic tape comprising:
   - recording reference signals in a plurality of parallel tracks along the length of a magnetic recording tape;
   - moving exploring means through the well for developing analog data signals representative of subsurface conditions;
   - moving the magnetic tape in synchronism with the movement of the exploring means through the well;
   - converting the analog data signals into parallel digital data signals;
   - separately detecting the reference signals recorded in the different tracks on the magnetic tape;
   - using a set of these detected reference signals to control the converting action;
   - recording the digital data signal elements across the magnetic tape in the various tracks thereof;
   - and using each of the sets of detected reference signals to control the recording of the digital signal elements in the corresponding track on the magnetic tape.

8. A method of recording well logging data on magnetic tape comprising:
   - recording evenly-spaced reference signals in a plurality of parallel tracks along the length of a magnetic recording tape;
   - moving exploring means through the well for simultaneously developing a plurality of analog data signals representative of various subsurface conditions;
   - moving the magnetic tape in synchronism with the movement of the exploring means through the well;
   - converting the analog data signals into a time-multiplexed series of parallel digital signals;
   - separately detecting the reference signals recorded in the different tracks on the magnetic tape;
   - using a set of these detected reference signals to control the converting action;

recording the digital signal elements across the magnetic tape in the various tracks thereof;

and using each of the sets of detected reference signals to control the recording of the digital signal elements in the corresponding track on the magnetic tape.

9. A method of recording well logging data on magnetic tape comprising:

recording evenly-spaced reference signals in a plurality of parallel tracks along the length of a magnetic recording tape;

moving exploring means through the well for simultaneously developing a plurality of analog data signals representative of various subsurface conditions;

moving the magnetic tape in synchronism with the movement of the exploring means through the well;

converting the analog data signals into a time-multiplexed series of parallel digital signals;

separately detecting the reference signals recorded in the different tracks on the magnetic tape;

using a set of these detected reference signals to control the converting action;

recording the digital signal elements across the magnetic tape in the various tracks thereof;

using each of the sets of detected reference signals to control the recording of the digital signal elements in the corresponding track on the magnetic tape;

detecting the reference signals recorded in one of the tracks from two different locations bearing a symmetrical relationship with respect to the desired path for such track during such movement;

and utilizing these last-mentioned detected signals for maintaining the desired transverse positioning of the magnetic tape during such movement.

References Cited by the Examiner

UNITED STATES PATENTS

| | | | |
|---|---|---|---|
| 2,937,239 | 5/1960 | Garber et al. ______ | 340—174.1 |
| 2,938,962 | 5/1960 | Konins et al. ______ | 179—100.2 |
| 3,047,836 | 7/1962 | Johnson et al. ______ | 340—15.5 |
| 3,134,957 | 5/1964 | Foote et al. ________ | 340—15.5 |
| 3,147,462 | 9/1964 | Levinson et al. ____ | 340—174.1 |
| 3,185,970 | 5/1965 | Cromleigh et al. ____ | 340—174.1 |

BENJAMIN A. BORCHELT, *Primary Examiner.*

R. M. SKOLNIK, *Assistant Examiner.*